UNITED STATES PATENT OFFICE.

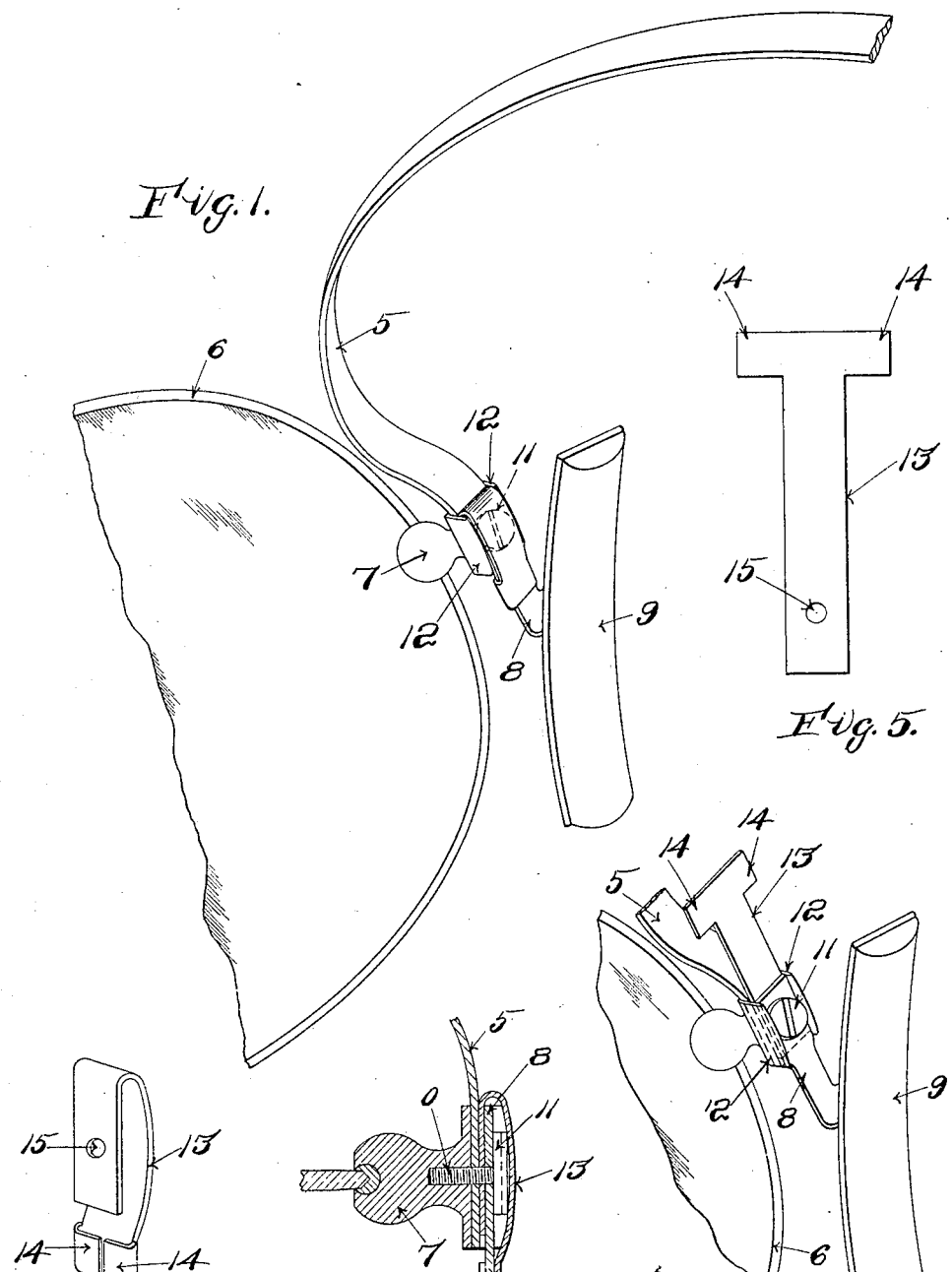

GEORGE MOORE, OF BOSTON, MASSACHUSETTS.

EYEGLASS-FITTINGS.

No. 869,587.  Specification of Letters Patent.  Patented Oct. 29, 1907.

Application filed February 7, 1907. Serial No. 356,139.

*To all whom it may concern:*

Be it known that I, GEORGE MOORE, a citizen of the United States, residing at Boston, county of Suffolk, and State of Massachusetts, have invented a certain new and useful Improvement in Eyeglass-Fittings, of which the following is a specification, reference being had therein to the accompanying drawings.

In eyeglass fittings one of the most frequent causes of trouble is the tendency of the stud screw to work loose and the consequent disarrangement of the other parts of the fittings.

The object of the present invention is to provide means whereby the stud screw will be securely locked against working loose after it is set up and after the parts are fitted together.

The invention will be fully understood from the following description taken together with the accompanying drawings, and the novel features are pointed out and clearly defined in the claims at the close of the specification.

In the drawings.—Figure 1 is a perspective view on an enlarged scale of a portion of one lens and the fittings attached thereto illustrating the invention with the parts completely assembled. Fig. 2 is a vertical section through the stud and fittings, enlarged. Fig. 3 is a perspective showing the parts in partially assembled position but before the blank strip which forms the clip has been bent into locking engagement with the stud screw and with the arm of the guard. Fig. 4 is a perspective of the locking clip detached but in the form in which it appears after the blank which forms the locking clip has been bent into engagement with the stud screw and arm of the guard. Fig. 5 is a plan of the blank which forms the locking clip before it is bent up.

Referring to the drawings,—5 represents the spring and 6 the eye wire of any ordinary construction of eyeglass fittings. 7 represents the stud, 8 the arm of the guard which carries the guard 9, and 10 the stud screw formed with a head 11, all of which may be of well known form of construction. The head of the stud 7 is provided with side flanges 12 which form side guards between which the spring 5 and eyeglass guard 8 are held when the parts are assembled and clamped together by the screw 10. All of the parts thus far described may be of well known form of construction. As thus far described, if there were no means for locking the stud screw, there would be a constant tendency for the screw to work loose, and this frequently occurs when no locking means is provided.

In order to lock the stud screw, I provide a locking clip which is made from a blank like that shown in its flattened form in Fig. 5. This blank is formed with a shank portion 13 of a width equal to the width between the two side flanges 12, 12, of the box of the post or stud 7 and having at one end laterally extending wings 14 on opposite sides and formed with a hole 15 through which the shank of the stud 10 can pass.

The parts are assembled while the blank is still in its flattened form as shown in Fig. 3, the shank of the locking blank being inserted between the guard arm 8 and the spring 5 before the screw 10 is inserted, bringing the screw hole 15 into registration with the screw holes in the guard arm 8 and spring 5. The screw 10 is then inserted and screwed up tight, clamping the guard arm and clip 13 and spring 5 securely to the stud 7. The inner end of the blank 13 is indicated by the dotted line in Fig. 3. The shank of the blank 13 is then bent over until it is brought down against the head 11 of the screw as shown in Fig. 2 and the side wings 14 are then turned down as represented in Figs. 1, 2 and 4, to embrace the guard arm 8. The wings 14 thus form clips which securely engage the guard arms 8 and hold the shank 13 in clamping engagement with the outer face of the head 11 of the screw 10, thus preventing the screw 10 from working out at all.

I claim as my invention:

1. In fittings for eyeglasses, in combination with a stud, stud screw, spring and guard arm, a locking clip having a shank which is inserted between the spring and the head of the screw, the screw passing through the guard arm, shank and spring into the stud, the body of the shank then being bent over the outside of the head of the screw into engagement therewith and having wing clips which are bent around the arm of the guard.

2. In fittings for eyeglasses, a locking clip for the stud screw consisting of a strip having a shank of a width equal to the width between the sides of the box of the stud and adapted to be inserted therebetween, and having a screw hole for the passage of the stud screw, said strip being adapted to be bent over the head of the stud screw after the screw has passed through said hole and having side wings which are adapted to be bent to form clips to engage the guard arm.

3. In fittings for eyeglasses, a locking clip for the stud screw consisting of a strip inserted between the spring and the head of the screw and having a screw hole for the passage of the stud screw, said strip being bent over the head of the stud screw after the screw has passed through said hole and having side wings which are bent to form clips to engage the guard arm.

In testimony whereof I affix my signature, in presence of two witnesses.

GEORGE MOORE.

Witnesses:
WILLIAM A. COPELAND,
ALNIE TARR.